Patented Dec. 29, 1931

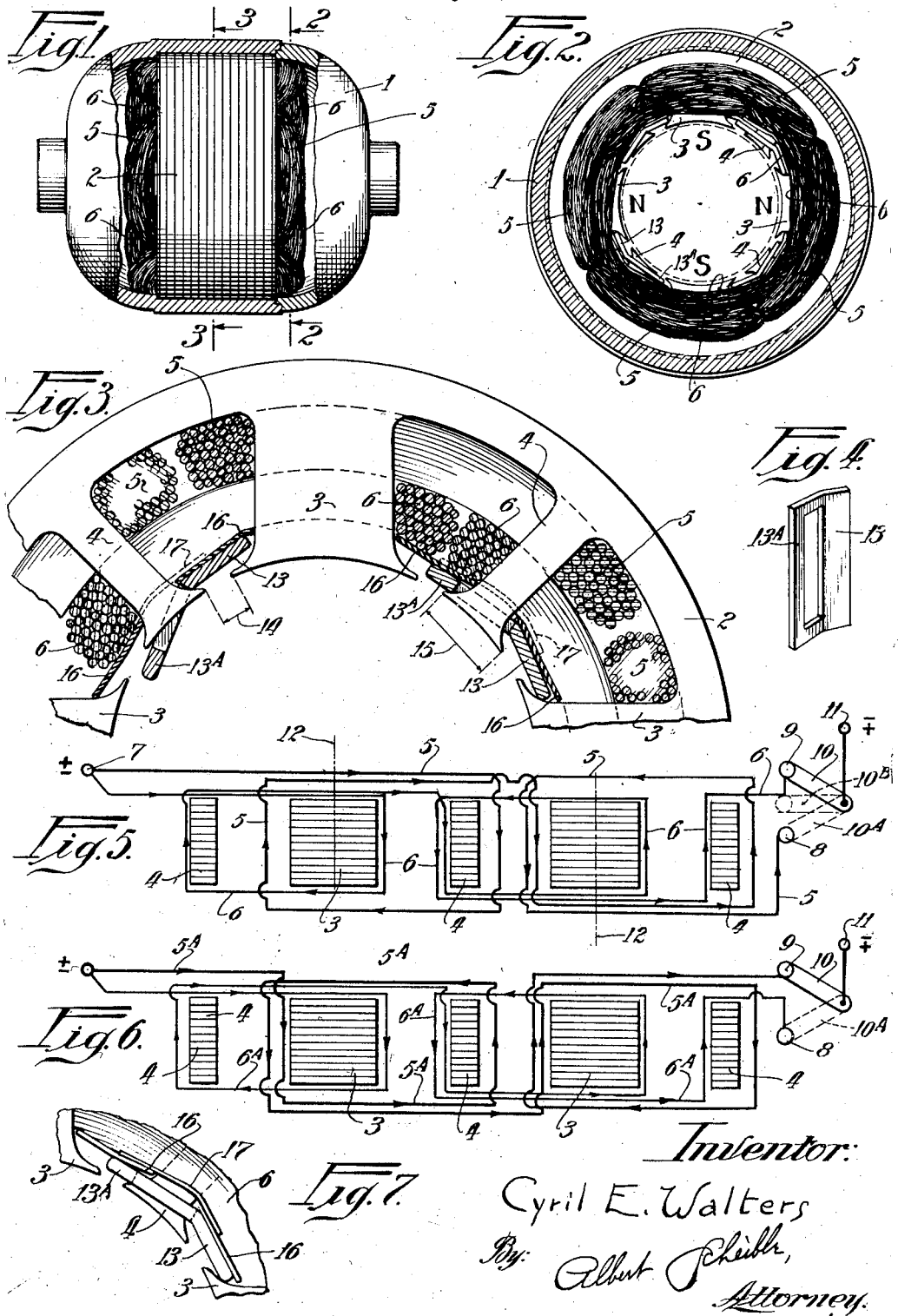

1,838,122

UNITED STATES PATENT OFFICE

CYRIL E. WALTERS, OF CHICAGO, ILLINOIS, ASSIGNOR, BY MESNE ASSIGNMENTS, TO UTAH RADIO PRODUCTS COMPANY, A CORPORATION OF ILLINOIS

STATOR FOR REVERSIBLE INDUCTION MOTORS

Application filed May 31, 1929. Serial No. 367,549.

My invention relates to electric motors of the induction type, such as those employing armatures with "squirrel cage" windings and having stators with inwardly directed poles. Such motors have long been employed effectively, and the stators for them have also been constructed for affording a high starting torque in one direction. However, it has heretofore been difficult to secure a high starting torque for operating such a motor in both directions; and it has likewise been difficult to secure a quick and positive halting of the motor, which is highly desirable in some class of motor-driven appliances.

Generally speaking, my invention aims to provide a stator for an electric motor of this general class which will afford a high torque for starting a rotation of the armature in either direction, which will accomplish this with a simple and inexpensive construction including simple field windings, and which will permit an almost instantaneous and positive halting of the armature by the mere shifting of the current supply from one to the other of two substantially counterpart field windings.

More particularly, my invention aims to provide a stator including shaded poles which will be equally effective for affording a starting torque in either direction, and for each of which shading poles only a single closed-circuit loop or "shading coil" will be required. Furthermore, my invention aims to provide a stator for this purpose which will include simple and easily assembled laminations and field coils, together with simple and inexpensive means for retaining the shading coils in their operative positions.

Still further and also more detailed objects will appear from the following specification, and from the accompanying drawings in which Fig. 1 is a side elevation of a motor embodying my invention, with a portion of the casing broken away.

Fig. 2 is an enlarged transverse section, taken along the line 2—2 of Fig. 1.

Fig. 3 is a fragmentary and enlarged transverse section, taken along the line 3—3 of Fig. 1, showing the position of one of the shading coils during its attaching.

Fig. 4 is a perspective view of one of the shading coils.

Figs. 5 and 6 are diagrams showing two arrangements of the circuit connections and switching means, with part of the poles omitted.

Fig. 7 is an enlargement of a portion of Fig. 2, showing the insulating strips which are interposed between one of the shading coils and an adjacent field coil.

In the illustrated embodiment, the casing 1 houses a plurality of counterpart and alined punchings formed of soft iron, which punchings conjointly form the core of the stator. These alined punchings or laminations constitute a stator core consisting of an annular outer portion 2, four inwardly projecting and uniformly spaced main poles 3, and four inwardly projecting shading poles 4 each interposed medially between two consecutive main poles.

To excite these poles, I provide two separate field windings each comprising four coils connected in series, the coils of one winding being here shown as all radially inward of the coils of the other winding. Every such field coil jointly encircles one main pole and one shading pole, but the two field coils associated with the same main pole extend respectively around the shading poles at opposite sides of that main pole.

Thus, in the radially outer field winding, each coil 5 conjointly encircles one main pole 3 and the adjacent shading pole 4 which is forward of the said main pole in a clockwise direction in Fig. 3. On the other hand, each coil 6 of the radially inner field winding jointly encircles a main pole 3 together with the shading pole 4 adjacent to that main pole in a counterclockwise direction in the same figure.

To provide for a selective use of the two field windings, I desirably connect one end of each winding (namely, the windings which respectively comprise the outer field coils 5 and the inner field coils 6) to one terminal 7 of the current supply circuit for the motor, while the other ends of the two windings are respectively connected to two switch terminals 8 and 9. Then I provide a switching member 10 connected to the other circuit terminal 11, this switching member being movable into or out of contact with the switch terminals 8 and 9.

When this switching member 10 is in the position shown in full lines in Fig. 5, the circuit through the field coils 5 is open, so that these coils 5 are inoperative. The magnetizing current then flows only through the field coils 6, each of which energizes one main pole 4 to the same polarity with the adjacent shading pole 4 at the left of that main pole. As the result, the effective magnetic axis is shifted to the left from the axial plane 12 of each main pole, thereby affording a strong starting torque towards the left. However, if the switching member is moved to the position 10A shown in dotted lines in Fig. 5, the field coils 6 alone are energized, thus imparting like polarities to each main pole and the shading pole at the right of that main pole, thereby shifting the magnetization to the right and producing a similarly strong starting torque toward the right.

Consequently, when starting with the switching member in the "off" position 10B, the motor can be started at high torque in one direction by moving the switching member into contact with the field terminal 9, or in the other direction by bringing the switching member into contact with the other field terminal 8. Returning the switching member to its intermediate position 10B opens both field circuits, so that the motor will stop as soon as the friction in the mechanism driven by it overcomes the inertia of the armature. If this inertia is high in proportion to the said friction, I can expedite the halting of the armature by momentarily contacting the switching member with the previously disconnected field terminal.

For example, if the motor is running with the switching member 10 in the position shown in full lines in Fig. 5, so that each main pole 3 has its effective axis of magnetization shifted to the right, a momentary moving of the switching member to the position 10A will shift the axis of magnetization to the left, thereby producing a strong torque for reversing the armature. Consequently, by thus momentarily placing the previously inoperative field windings in circuit and then moving the switching member to its inoperative position 10B, I can almost instantly halt the motor even if the friction of the mechanism driven by the motor is so low that the armature would otherwise continue to rotate for a considerable period under the influence of its own inertia.

To increase the efficiency of my motor, I desirably widen the inner ends of each main pole and each shading pole, as shown in Fig. 3, and also employ a shading loop associated with the inner end of each shading pole. Each shading loop desirably is a flat copper punching, formed as shown in Fig. 4, and having one longitudinal frame member 13 considerably wider than the gap 14 between the inner end of a main pole and an adjacent shading pole, while the other longitudinal frame member 13A is approximately of the same width as the said gap. The shading loop desirably is formed so as to dispose its said frame members 13 and 13A in planes oblique to each other, and may then have the interior width of the loop considerably less than the width 15 of the inner end of one of the shading poles.

With each shading loop thus proportioned, the wider longitudinal frame member 13 of the loop can be inserted first between a shading pole and an adjacent main pole, after which the loop is slid toward that shading pole (and somewhat to the left beyond the intermediate position shown in the left hand portion of Fig. 3) so as to snap the narrower frame member 13A of the shading loop over the projecting tip portion at the opposite side of the shading pole. Then the shading coil can be clamped in position by insulating strips 16 at opposite sides of the shading pole, and auxiliary strips 17 radially outward of and each overlapping two of the strips 16.

Since the field coils as ordinarily wound are somewhat compressible, the two coils extending around each shading pole can readily be compressed sufficiently to permit the insertion of the shading loop and the insulating strips, after which the resiliency of these coils expands them again and acts through the said strips to clamp the shading loop against the pole projections on the shading pole and on an adjacent main pole. I thus secure a simple and rigid assembly in which each of the narrower or shading poles becomes also a shaded pole.

Since the rate of alternations in available currents is quite high, the polarity of each main pole in my motor is reversed correspondingly often, regardless of whether one or the other of my sets of series-connected field coils are in the circuit. Consequently, it is immaterial whether or not the two field coils associated with the same main pole are wound in the same direction around that pole. Thus, while in Fig. 5 the field coils 5 and 6 are wound in the same direction around each given main pole, my motor will function equally well if the coils (5A and 6A) were wound in opposite directions around the same main pole 4, as shown in Fig. 6.

Moreover, I do not wish to be limited to other details of the construction and arrangement above disclosed, since many changes might be made without departing either from the spirit of my invention or from the appended claims. For example, while I have illustrated a stator having four main poles, this number might obviously be increased.

So also, I do not wish to be limited to the interposing of shaded poles between every two consecutive main poles, it being evident that even with a so-called four pole stator as here illustrated, both the reversibility, the high starting torque in either direction, and the instantaneous halting could be obtained even if two diametrically opposite or shaded poles were omitted.

I claim as my invention:

1. In a motor, a stator comprising an annular outer portion, an even number of pole sections extending radially inward and substantially equally spaced circumferentially of the annular portion, said pole sections having widened tips at their inner ends, field coils each encircling two adjacent pole sections, and radially removable shading coils having one longitudinal frame member substantially wider and another frame member substantially narrower than the space between adjacent edges of the pole faces to enable each shading coil to be slipped radially onto its respective pole section and positioned with said wide frame member in inter-engagement with the widened tip of the adjacent pole section to retain said field coils in position on said pole sections.

2. In a motor, a stator comprising an annular outer portion, an even number of pole sections extending radially inwardly of the annular portion, two selectively excitable field windings comprising series-connected coils each encircling two adjacent pole sections, the coils of one of said windings lying radially outwardly of the coils of the other of said windings and in staggered relationship thereto, and means for securing said windings rigidly in position against said annular portion comprising shading coils encircling alternate pole sections, each of said shading coils having a part wedged between the pole section which it shades and an adjacent pole section to bear against a coil of the inner winding at the mid-portion thereof to press the same outwardly, an opposite part of said shading coil being arranged to bear against an end of said inner coil.

Signed at Chicago, Illinois, May 28th, 1929.

CYRIL E. WALTERS.